United States Patent [19]

English, Jr. et al.

[11] Patent Number: 5,408,553
[45] Date of Patent: Apr. 18, 1995

[54] OPTICAL POWER SPLITTER FOR SPLITTING HIGH POWER LIGHT

[75] Inventors: Ronald E. English, Jr., Tracy; John J. Christensen, Manteca, both of Calif.

[73] Assignee: The United States of America as represented by the United States Department of Energy, Washington, D.C.

[21] Appl. No.: 935,330

[22] Filed: Aug. 26, 1992

[51] Int. Cl.6 .......................... G02B 5/04; G02B 7/18
[52] U.S. Cl. ...................................... 385/36; 385/33; 385/47; 385/48; 359/636; 359/639; 359/640
[58] Field of Search ...................... 385/33, 36, 47, 48; 359/639, 640, 636, 583, 834

[56] References Cited

U.S. PATENT DOCUMENTS

| | | | |
|---|---|---|---|
| 4,737,023 | 4/1988 | Kastendieck et al. | 359/629 X |
| 5,105,299 | 4/1992 | Anderson et al. | 359/223 |

FOREIGN PATENT DOCUMENTS

| | | | |
|---|---|---|---|
| 0089750 | 8/1978 | Japan | 385/36 |
| 1-167818 | 7/1989 | Japan | 372/100 |
| 0211147 | 7/1925 | United Kingdom | 359/639 |

OTHER PUBLICATIONS

Fiber Intergrated Optics, vol. 6, No. 1, 1987–*Review of Optical Fiber Couplers* . . . , Author/A. K. Abarwal, pp. 27–53.

Applied Optics, Feb. 20, 1992, *Passive optical fiber star coupler*, pp. 746–748 Authors/A. Brockmeyer, J. Coutandin, W. Groh, T. F. Stehlin and J. Theis.

Optics Communications, vol. 72, No. 3,4, Jul. 15, 1989, *The Fabrication of a 25×25 Multiple Beam Splitter*, Authors/Xuenoong Lu, Ying Wang, Minxian Wu and Guofan Jin, pp. 157–162.

*Primary Examiner*—Rodney B. Bovernick
*Assistant Examiner*—Hemang Sanghavi
*Attorney, Agent, or Firm*—Miguel Valdes; Rodger S. Gaither; William R. Moser

[57] ABSTRACT

An optical power splitter for the distribution of high-power light energy has a plurality of prisms arranged about a central axis to form a central channel. The input faces of the prisms are in a common plane which is substantially perpendicular to the central axis. A beam of light which is substantially coaxial to the central axis is incident on the prisms and at least partially strikes a surface area of each prism input face. The incident beam also partially passes through the central channel.

8 Claims, 4 Drawing Sheets 5,408,553

OPTICAL POWER SPLITTER FOR SPLITTING HIGH POWER LIGHT

The United States Government has rights in this invention pursuant to Contract No. W-7405-ENG-48 between the United States Department of Energy and the University of Califorina.

BACKGROUND OF THE INVENTION

1. Field of the Invention

The present invention relates to the field of optics and, in particular, to a device for splitting high-power light energy into a plurality of light beams. The United States Government has rights in this invention pursuant to Contract No. W-7405-ENG-48 between the United States Department of Energy and the University of California.

2. Description of the Related Art

Fiber optic power splitters are optical devices which distribute light energy from one optical fiber into several output fibers. An ideal power splitter would distribute the light energy to a given number of output fibers with no scattering loss and would remain insensitive to the amount of light energy transmitted to each output fiber. Based on these desired characteristics, two broad approaches to power splitters have been developed. See Arun K. Agarwal, *Review of Optical Fiber Couplers*, Fiber and Integrated Optics, Vol. 6, No. 1, 1987.

In the first broad approach, known as surface interaction type power splitters, each output fiber has a source end which is open to a common area where all or a portion of the light from a single input fiber enters the common area to be reflected or guided to each output fiber. Examples of this surface interaction approach are fused biconical tapered structures and mixer element star couplers.

Most applications of surface interaction type power splitters, however, are in low power information-distribution applications. This environment limits the kinds of information-distribution components that can be used and requires careful management of the optical power (light) to avoid damage to the components.

In the second broad approach, core interaction type power splitters, the power transfer takes place from the core of the single input fiber to the cores of the output fibers. Such a straightforward approach employs amplitude beamsplitters and focusing optics to split power from the core of the input fiber to the cores of the output fibers.

This core interaction approach works well for two output fibers. However, complex optical subsystems are required between the beamsplitters and the output fibers to insure satisfactory coupling. This renders the core interaction approach cumbersome and unwieldy when more than two output fibers are present.

One way of removing the complex optical subsystems required by the core interaction approach is to employ two fused silica microprisms and to fuse the fibers directly onto the prism surfaces (See Agarwal, pages 37-38, FIG. 10). Although this approach provides satisfactory coupling, it remains cumbersome when increasing numbers of output fibers are required. Thus, there is a need for a high-power, power splitting device which can easily distribute light energy to large numbers of output fibers.

SUMMARY OF THE INVENTION

The present invention provides a power splitter for forming a plurality of divided beams of light from a single beam of light. The power splitter comprises a plurality of prisms arranged about a central axis so that a central channel is formed. The input faces of the prisms lie in a common plane substantially perpendicular to the central axis. The hypotenuse sides of the prisms face the central axis. A plurality of divided beams of light are formed when a portion of a beam of light incident upon the prism input faces along the central axis strikes the input face of each prism and a central portion of the beam of light passes through the central channel.

The present invention thereby provides a simple way of splitting high-power light energy without complex optical pathways and without use of sensitive components.

A better understanding of the features and advantages of the present invention may be obtained by reference to the detailed description of the invention and the accompanying drawings which set forth an illustrative embodiment in which the principles of the invention are utilized.

DETAILED DESCRIPTION OF THE INVENTION

A preferred embodiment of a fiber-to-fiber power splitting device 10 according to the present invention is described with reference to FIG. 1.

The power splitting device 10 of the present invention receives a high-power beam of light from an input fiber 12, splits the high-power beam of light into a number of beams of light, and then injects each separate beam of light into an associated output fiber. For clarity and simplicity, FIG. 1 depicts three output fibers 14a, 14b, and 14c, but there are actually a plurality of output fibers which are powered by the single input fiber 12.

Figure 1:
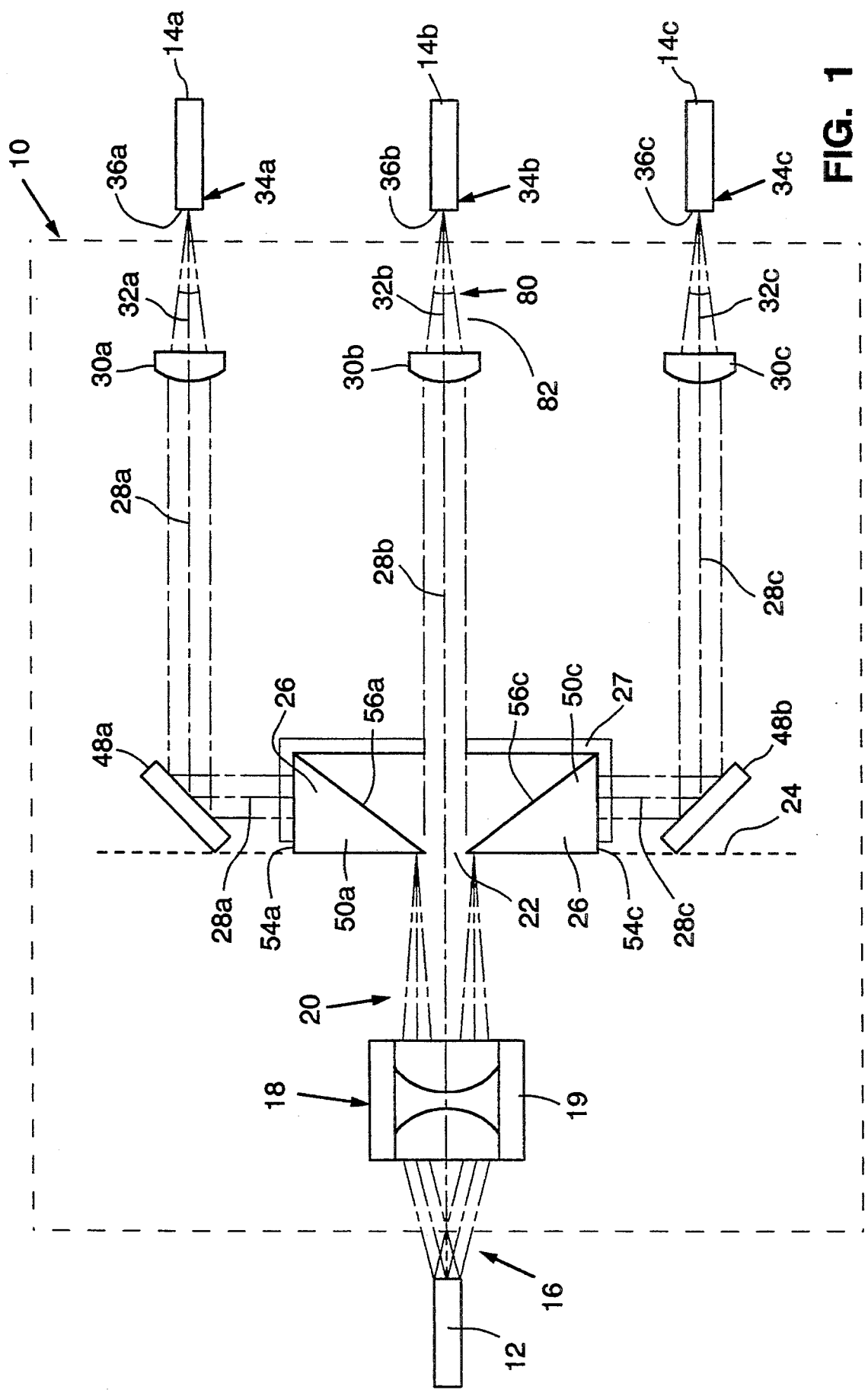
FIG. 1 is a schematic representation of a fiber-to-fiber power splitting device in accordance with the present invention.

Referring to FIG. 1, the high-power beam of light from the input fiber 12 is output to power splitting device 10 as a high-power diverging beam of light 16. A condenser lens 18, which is positioned within a condenser lens housing 19 to be optically aligned with the input fiber 12, receives the diverging beam of light 16 and projects a condensed beam of light 20 by concentrating the diverging beam of light 16 into an area 22 located at the rear focal plane 24 of the condenser lens 18.

Next, a prism segmenter 26, which is positioned within a prism mounting block 27 to be optically aligned with the condenser lens 18 at the rear focal plane 24, receives the condensed beam of light 20 and forms three divided beams of light 28a, 28b, and 28c by power splitting the condensed beam of light 20 according to the present invention. The divided beams of light 28a and 28c are then reflected by fold mirrors 48a and 48b, respectively.

Each divided beam of light 28a, 28b, and 28c is then projected from the prism segmenter 26 onto a corresponding inverse projector lens 30a, 30b, and 30c, respectively. Each inverse projector lens 30a, 30b, and 30c receives the corresponding divided beam of light 28a, 28b, and 28c and projects a converging beam of light 32a, 32b, and 32c toward a corresponding output fiber 14a, 14b, and 14c, respectively. Each inverse projector lens 30a, 30b, and 30c forms an image of the prism segmenter 26 on an opening 36a, 36b, and 36c of the corresponding output fiber 14a, 14b, and 14c, respectively. The converging beams of light 32a, 32b, and 32c are focused to a point 34a, 34b, and 34c, respectively, within the opening 36a, 36b, and 36c of each output fiber 14a, 14b, and 14c. Alternatively, the converging beams of light 32a, 32b, and 32c can be focused to a point (not shown in FIG. 1) just outside the opening 36a, 36b, and 36c of each output fiber 14a, 14b, and 14c, respectively.

Figures 2, 2A:
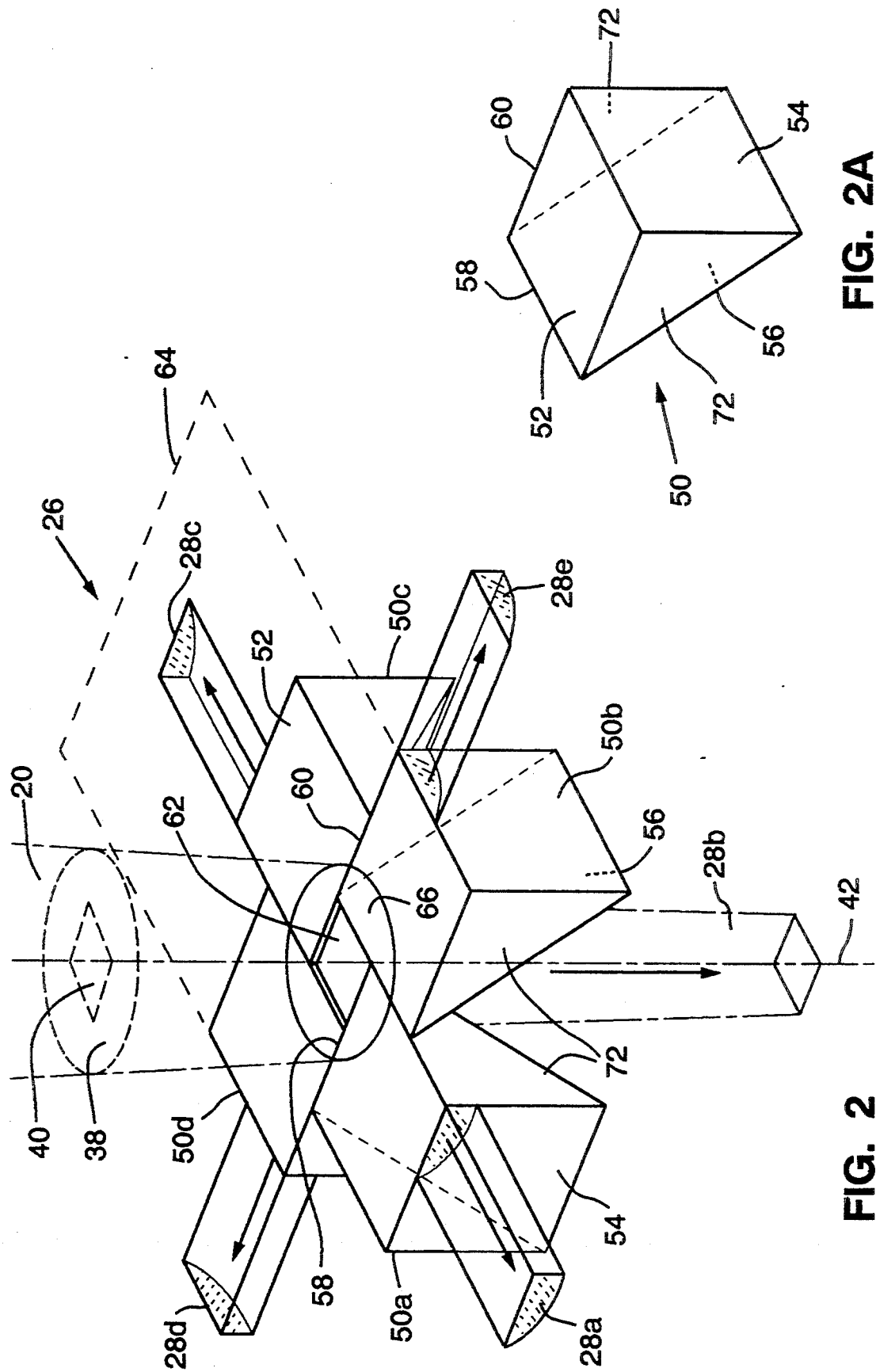
FIG. 2 is a perspective view of a four-prism prism segmenter in accordance with the present invention.
FIG. 2A is a perspective view of a single prism in accordance with the present invention.

Referring now to FIG. 2, which uses the same reference numbers as FIG. 1 for the same elements, the condensed beam of light 20 has a peripheral portion 38 and a central portion 40. Beam 20 is substantially coaxial with a central axis 42 as it strikes the prism segmenter 26. The prism segmenter 26 is comprised of four prisms 50a, 50b, 50c, and 50d. Referring to FIG. 2A, each prism 50 has an input face 52, an output face 54, a hypotenuse face 56, a first edge 58, and a second edge 60.

As shown in FIG. 2, the first edge 58 of each of the prisms 50a, 50b, 50c, and 50d is contiguously connected to the second edge 60 of one of the other prisms 50a, 50b, 50c, and 50d so that the prisms 50a, 50b, 50c, and 50d form a central channel 62 around the central axis 42. Each of the prisms 50a, 50b, 50c, and 50d is oriented so that each input face 52 is positioned within a common plane 64 which is substantially perpendicular to the central axis 42, each output face 54 is perpendicular to each input face 52, and each hypotenuse face 56 faces the central axis 42. The prisms 50a, 50b, 50c, and 50d may be positioned so that the central channel 62 may be any desired size.

The divided beams of light 28a, 28c, 28d, and 28e are formed when the peripheral portion 38 of the condensed beam of light 20 strikes a surface area 66 of each input face 52 while a fifth divided beam of light 28b is formed from the central portion 40 of the condensed beam of light 20 which passes unaffected through the central channel 62. The light striking the input surface area 66 is projected out through the output face 54 of each of the prisms 50a, 50b, 50c, and 50d as divided beams of light 28a, 28c, 28d, and 28e, respectively, by the total internal reflection of the prisms 50a, 50b, 50c, and 50d.

Referring again to the schematic shown in FIG. 1, the divided beams of light 28a and 28c exiting from output faces 54a and 54c are projected away from the condensed beam of light 20 at an angle determined by the hypotenuse faces 56a and 56c of prism 50a and 50c. In the preferred embodiment of the present invention, commercially available right-angle prisms, like Model 01-PQB-002/078 manufactured by Melles-Griot are utilized.

Thus, when a right-angle prism is utilized, the divided beam of light 28 reflected through a prism 50 is projected away from the condensed beam of light 20 at right angles. As shown in FIG. 1, fold mirrors 48a and 48b may be utilized to redirect divided beams of light 28a and 28c to its corresponding inverse projector lens 30a and 30c.

Alternatively, any angled prism may be utilized. However, angles other than right-angles may require a reflective coating on the hypotenuse face 56 of the prism 50 to insure that all of the peripheral portion 38 of the condensed beam of light 20 is reflected through the prism 50.

Referring back to FIG. 2, the intensity of the divided beams of light 28a, 28b, 28c, 28d, and 28e are directly proportional to the surface area 66 struck by the condensed beam of light 20. In the preferred embodiment of the present invention, the condensed beam of light 20 strikes an equivalent surface area on each input face 52. Alternatively, the prism segmenter 26 may be aligned so that the surface area 66 struck, and thus the intensity of the divided beams of light 28a, 28b, 28c, 28d, and 28e, is unequal.

Figure 3:
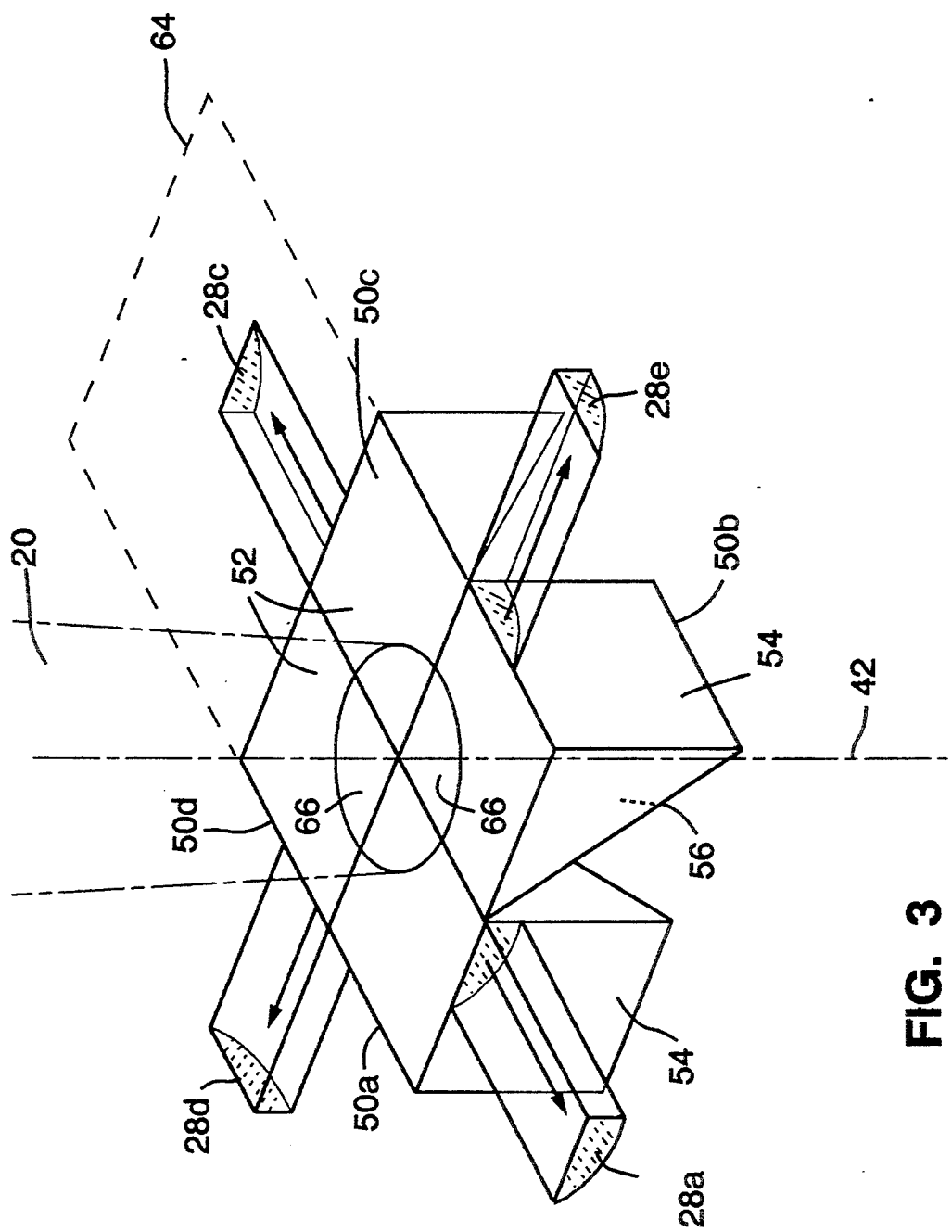
FIG. 3 is a perspective view of an alternative embodiment the prism segmenter according to the present invention.

The prisms 50a, 50b, 50c, and 50d can be positioned so that the condensed beam of light 20 partially strikes each input face 52 and partially passes through the central channel 62. Alternatively, as shown in FIG. 3, the prisms 50a, 50b, 50c, and 50d can be arranged around the central axis 42 so that no central channel 62 is formed. In the embodiment of FIG. 3, the divided light is comprised entirely of divided beams light 28a, 28c, 28d, and 28e.

At present, it is perceived that the central channel concept of FIG. 2 has two advantages over the embodiment of FIG. 3. First, the central channel 62 provides an additional divided beam of light 28b. Thus, it takes fewer prisms to obtain the desired number of beams of light. Secondly, the variable size of the central channel 62 provides the divided beams of light 28a, 28b, 28c, 28d, and 28e with differing intensities. By making the central channel 62 large, the beams of light will have one high-intensity beam and several lesser-intensity beams. Conversely, a small central channel 62 will produce one low-intensity beam and several higher-intensity beams. Therefore, it appears that the central channel embodiment has greater flexibility in application.

Figure 4:
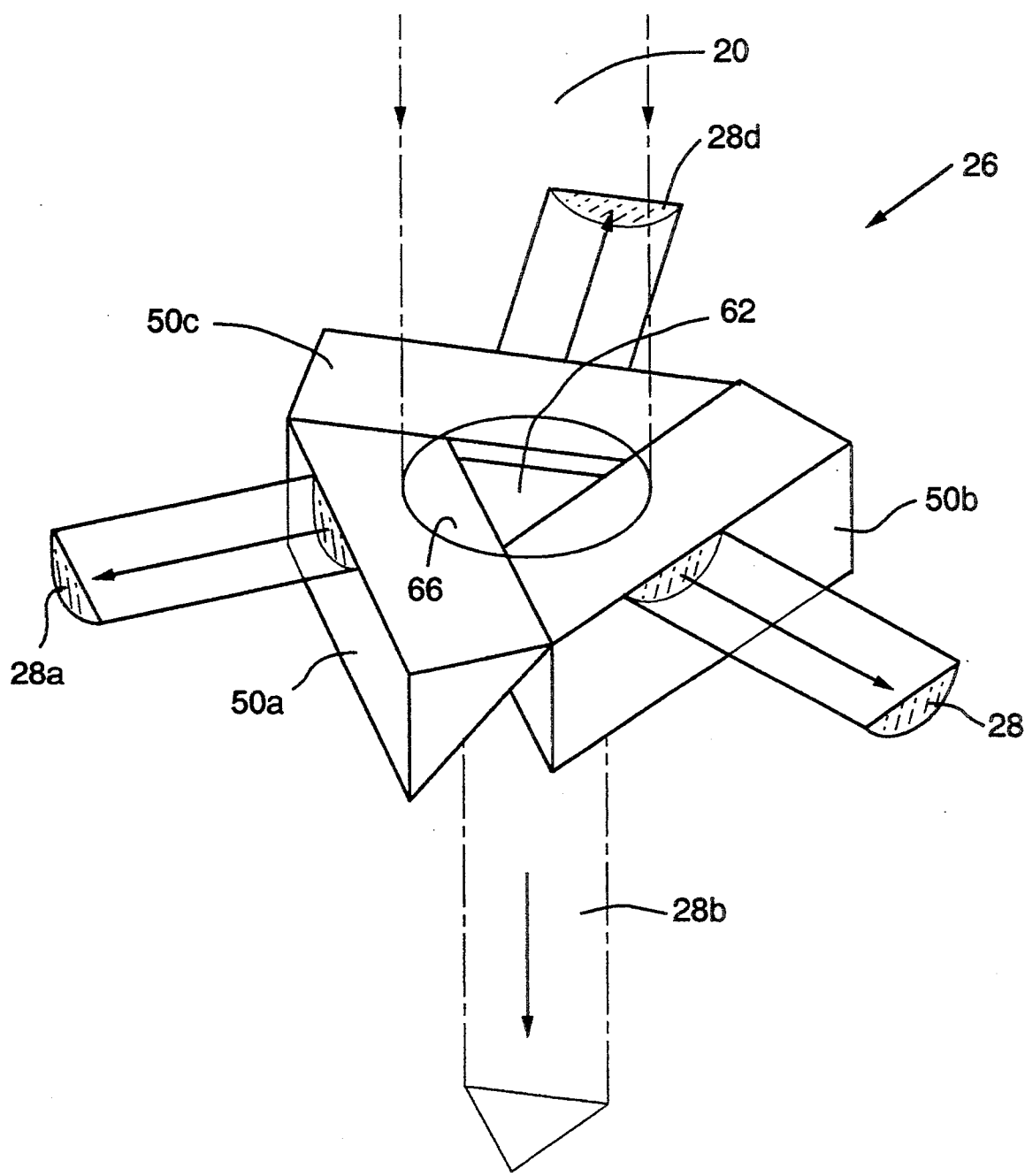
FIG. 4 a perspective view of a three-prism prism segmenter in accordance with the present invention.

The number of prisms 50 which may be utilized in the prism segmenter 26 is arbitrary and is limited only by design constraints such as transmission requirements and practical mechanical packaging restrictions. As an example of the flexibility of the present invention, a three-prism prism segmenter 26 is shown in FIG. 4.

Referring again to FIG. 2A, in the preferred embodiment of the present invention, the prism segmenter 26 (not shown in FIG. 2A) is formed by separately holding each prism 50 in its respective position by clamping the prism mounting block 27 (not shown in FIG. 2A) to the sides 72 of each prism 50. Alternatively, the prism segmenter 26 may be made by using an appropriate high-temperature adhesive or other suitable connectors to secure the prisms relative to each other.

With the exception of the prism segmenter 26, which is desirably located at the rear focal plane 24 of the condenser lens 18, the relative positions of the condenser lens 18 and of the inverse projector lens 30 are a function of the desired results. The focal length of the condenser lens 18 and the divergence angle of light rays 16 from input fiber 12 determine the diameter of the condensed beam of light 20. The diameter of the condensed beam of light 20 is equal to the product of the focal length and the divergence angle.

In a preferred embodiment of the present invention, the condenser lens 18 is positioned approximately 1.2–1.3 centimeters from the input fiber 12. The condenser lens 18 may be any commercially available condenser lens, like Model 01-CMP-119 manufactured by Melles-Griot.

The inverse projector lenses 30 can be positioned with respect to the prism segmenter 26 in any convenient location that allows the inverse projector lens 30 to capture the divided beams of light 28 projected by the prism segmenter 26. In a preferred embodiment of the present invention, each inverse projector lens 30 is positioned approximately 20.3–25.4 centimeters from the prism segmenter 28. The inverse projector lens 30 may be any commercially available lens, like Model FPX-11610/000 manufactured by JML Optics. The inverse projector lens 30 can be positioned relative to the output fiber 14 in any convenient location which images the prism segmenter 26 onto the opening 36 of the output fiber 14 or which allows the converging beam of light 32 to be focused within the opening 36 of output fiber 14.

The relative positioning of the inverse projector lens 30 with respect to the output fiber 14 affects mainly how well imaged the prism segmenter 26 is on the opening 36 of the output fiber 14 or, alternately, where the focus 34 lies with respect to the opening 36 of the output fiber 14. As the output fiber 14 is positioned closer to the inverse projector lens 30, the point of focus 34 within the output fiber 14 is farther from the opening 36. In a preferred embodiment of the present invention, the inverse projector lens 30 is positioned approximately 1.2–1.3 centimeters from the output fiber 14.

In a first alternative embodiment of the present invention, the high-power diverging beam of light 16 may be projected directly from the input fiber 12 onto the input faces 52 of the prism segmenter 26. This embodiment has the advantage of eliminating the condenser lens 18, but has the disadvantage of reducing the uniformity of intensity of the beam of light that strikes the input faces 52 of the prism segmenter 26.

In a second alternative embodiment of the present invention, the prism segmenter 26 may be comprised of a plurality of triangularly shaped segments containing beveled mirrors instead of the plurality of prisms 50. In this embodiment, each beveled mirror would be located in a position which corresponds to one hypotenuse face 60 of the prisms 50 so that the peripheral portion 38 of the condensed beam of light 20 strikes the beveled mirror and is reflected away from the condensed beam of light 20.

In a third alternative embodiment of the present invention, the condensed beam of light 20 can be a laser or other light source which is projected directly from the laser or other light source onto the prism segmenter without passing through the input fiber 12 or the condenser lens 18. In this embodiment, the splitting of the light to the output fibers would be the same.

In a fourth alternative embodiment, the direction of the light through the prism segmenter is reversed so that light would enter the central channel 42 and the output faces 54 of each prism 50. The light is then combined in the prism segmenter and then delivered to a single output fiber. In this embodiment, the prism segmenter functions as a combiner.

It should be understood that various alternatives to the structures described herein may be employed in practicing the present invention. It is intended that the following claims define the invention and that the structure within the scope of these claims and their equivalents be covered thereby.

What is claimed is:

1. A power splitter for forming a plurality of divided beams of light from a single beam of light, the power splitter comprising:
   condenser lens means for receiving a diverging beam of light and for projecting a condensed beam of light by concentrating said diverging beam of light into a condensed area located at a rear focal plane of said condenser lens means, said condensed beam of light having a peripheral portion and a central portion;
   prism segmenter means, located at said rear focal plane of said condenser lens means, for receiving said condensed beam of light, for power splitting said condensed beam of light, and for projecting a plurality of divided beams of light; and
   a plurality of inverse projector lens means for receiving said plurality of divided beams of light and for projecting a plurality of converging beams of light, each inverse projector lens means receiving a corresponding divided beam of light from said prism segmenter means and projecting a converging beam of light to a corresponding output optical fiber by imaging said prism segmenter onto the opening of said output optical fiber.

2. The power splitter of claim 1 wherein the prism segmenter means comprises:
   a plurality of prisms, each of said plurality of prisms having an input face said plurality of prisms arranged to form a central channel around a central axis, said input faces of said plurality of prisms lying within parallel planes which planes are substantially perpendicular to said central axis,
   wherein a plurality of divided beams of light are formed when said peripheral portion of said condensed beam of light strikes said input faces of said plurality of prisms and said central portion of said condensed beams of light passes through said central channel.

3. The poser splitter of claim 2 wherein said peripheral portion of said condensed beam of light which strikes each of said input faces of said plurality of prisms is substantially equivalent.

4. The power splitter of claim 2 wherein each of said plurality of prisms is a right-angle prism.

5. The power splitter of claim 1 wherein the prism segmenter means comprises:
   a plurality of prisms, each of said plurality of prisms having an input face, an output face, and a hypotenuse face said plurality of prisms arranged such that said input faces of said plurality of prisms lie within parallel planes, each output face being perpendicular to each input face, and each prism being positioned with respect to the remaining prisms so that said condensed beam of light strikes each input face of said plurality of prisms.

6. The power splitter of claim 1 wherein the prism segmenter means comprises:
   a plurality of mirrors, each of said plurality of mirrors having a reflecting face and a non-reflecting face, said plurality of mirrors arranged to form a central channel around a central axis, said reflecting faces of said plurality of mirrors facing said single beam of light and forming an obtuse angle between a line parallel to the single beam of light and a line parallel to the reflecting face, said mirror non-reflecting faces facing the central axis, wherein a plurality of divided beams of light are formed when said peripheral portion of said single beam of light strikes the mirror reflecting faces and said central portion of said single beam of light, passes through said central channel.

7. A method for forming plurality of divided beams of light from a single beam of light comprising the steps of:

concentrating a diverging beams of light to form a condensed beam of light having a peripheral portion and a central portion;

providing a plurality of prisms, each of said plurality of prisms having an input face which receives a different part of said peripheral portion of said single beam of light, said plurality of prisms arranged to form a central channel around a central axis, said input faces of said plurality of prisms lying within parallel planes which planes which planes are substantially perpendicular to said central axis;

striking said peripheral portion of the condensed beam of light onto said input faces of said plurality of prisms to form a plurality of divided beams of light;

passing said central portion of said condensed beam of light through said central channel formed by said plurality of prisms to form a central divided beam of light; and focusing each of said plurality of divided beams of light and said central divided beams of light to form a plurality of converging beams of light.

8. A prism segmenter for forming a plurality of divided beam of light from a single beam of light, the single beam of light having a peripheral portion and a central portion, the prism segmenter comprising:

a plurality of mirrors, each of said plurality of mirrors having a reflecting face and a non-reflecting face, said plurality of mirrors arranged to form a central channel around a central axis, said reflecting faces of said plurality of mirrors facing a single beam of light and forming an obtuse angle between a line parallel to said single beam of light and a line parallel to said reflecting face, said non-reflecting faces of said plurality of mirrors facing said central axis, wherein a plurality of divided beams of light are formed when a peripheral portion of said single beam of light strikes said reflecting faces of said plurality of mirrors and a central portion of said single beam of light passes through said central channel.

* * * * *